United States Patent
Yu

(10) Patent No.: US 7,447,012 B2
(45) Date of Patent: Nov. 4, 2008

(54) OPTICAL DISC DRIVE AND HOUSING OF AN ELECTRONIC DEVICE

(75) Inventor: Shih-Ming Yu, Taipei (TW)

(73) Assignee: Lite-On It Corporation, Hsinchu (TW)

( * ) Notice: Subject to any disclaimer, the term of this patent is extended or adjusted under 35 U.S.C. 154(b) by 529 days.

(21) Appl. No.: 11/306,559

(22) Filed: Jan. 3, 2006

(65) Prior Publication Data

US 2007/0074231 A1    Mar. 29, 2007

(30) Foreign Application Priority Data

Sep. 26, 2005  (TW) .............................. 94133313 A

(51) Int. Cl.
*G05K 1/16*    (2006.01)

(52) U.S. Cl. ....................... 361/685; 200/345; 411/340; 600/407

(58) Field of Classification Search ............... 200/124.1, 200/345, 618; 248/74.5, 476; 411/37, 340, 411/44; 600/429, 407; 361/679–687, 724–727

See application file for complete search history.

(56) References Cited

U.S. PATENT DOCUMENTS

| | | | | |
|---|---|---|---|---|
| 5,038,544 A | * | 8/1991 | Traut | .......................... 52/716.2 |
| 5,660,424 A | * | 8/1997 | Aymerich et al. | ........ 296/97.12 |
| 5,991,122 A | * | 11/1999 | Tangren et al. | ........... 360/244.2 |
| 2006/0046532 A1 | * | 3/2006 | Hjort et al. | .................... 439/74 |

* cited by examiner

*Primary Examiner*—Hung V Duong
(74) *Attorney, Agent, or Firm*—Jianq Chyun IP Office

(57) ABSTRACT

A housing adapted for use in an electronic device is provided. The housing includes a first member, a second member, and a fastener. The first member has a first fastening hole and a weakening structure disposed around the first fastening hole. The second member has a second fastening hole. The fastener passes through the first fastening hole and the second fastening hole to fix the first member and the second member to each other.

11 Claims, 5 Drawing Sheets

OPTICAL DISC DRIVE AND HOUSING OF AN ELECTRONIC DEVICE

CROSS-REFERENCE TO RELATED APPLICATION

This application claims the priority benefit of Taiwan application serial no. 94133313, filed on Sep. 26, 2005. All disclosure of the Taiwan application is incorporated herein by reference.

BACKGROUND OF THE INVENTION

1. Field of Invention

The present invention relates to a housing adapted for use in an electronic device, and more particularly, relates to a housing adapted for use in an optical disc drive and having a weakening structure.

2. Description of Related Art

An optical disc has the advantages of being low in price, easy to carry, large in storage capacity, easy to keep, capable of being kept for a long period of time, and low in cost, etc., with its data being not easily damaged. Therefore, the optical disc has gradually replaced the traditional magnetic storage medium and become an optical storage medium indispensable to the modern life. As the optical disc is widely used, the optical disc drive for playing the audio-video information stored on the optical disc has become a necessary audio-video home appliance in daily life.

FIG. 1 depicts a schematic explosive view of a conventional optical disc drive. Referring to FIG. 1, a conventional optical disc drive 100 consists of a lower member 110, an upper member 120, an optical disc read module 130 and multiple screws 140. The optical disc read module 130 is disposed inside the lower member 110, and the upper member 120 is used to cap the lower member 110 to form the housing of the optical disc drive 100. Furthermore, the sides of the upper member 120 and the lower member 110 are provided with multiple screw holes 122 and 112 respectively. The upper member 120 can be locked onto the lower member 110 by causing the screws 140 to pass through the screw holes 122 of the upper member 120 and the screw holes 112 of the lower member 110.

However, as the structural strength of the lower member 110 is generally higher than that of the upper member 120, the upper member 120 will be distorted under the influence of the lower member 110 when the dimension of the lower member 110 deviates greatly. Meanwhile, the distortion of the upper member 120 will also cause the lower member 110 to be distorted, thereby making the lower member 110 unable to lie on a table steadily. Any of the above-mentioned conditions will cause the appearance of the optical disc drive 100 to be uneven, and further reduce its product yield. To increase the product yield, it is necessary to produce the upper member 120 and the lower member 110 in more accurate dimensions, which results in higher cost.

SUMMARY OF THE INVENTION

Accordingly, the object of the present invention is to provide a housing adapted for use in an electronic device and an optical disc drive adapted for improving the smoothness of the appearance of the housing.

The invention provides an optical disc drive, including a first member, a second member, a fastener and an optical disc read module. The first member is provided with a first base plate and a first side plate vertically connected to the first base plate. The first side plate has a first fastening hole and a weakening structure disposed around the first fastening hole. The second member is provided with a second base plate and a second side plate vertically connected to the second base plate. The second side plate has a second fastening hole. The fastener passes through the first fastening hole and the second fastening hole to fix the first member and the second member to each other. The optical disc read module is arranged in the accommodating space formed by the first member and the second member.

In one embodiment, the aforementioned weakening structure can be a U-shaped through-hole or a C-shaped through-hole, or can be a U-shaped through-hole with a dot-shaped through-hole, and the dot-shaped through-hole disposed at the opening of the U-shaped through-hole. In another embodiment, the weakening structure includes two linear through-holes disposed respectively at two sides of the first fastening hole. Further, two dot-shaped through-holes can be implemented between these linear through-holes, and respectively disposed at the other two sides of the first fastening hole.

According to another object of the invention, it discloses a housing adapted for use in an electronic device, including a first member, a second member and a fastener. The first member has a first fastening hole and a weakening structure disposed around the first fastening hole. The second member has a second fastening hole. The fastener passes through the first fastening hole and the second fastening hole to fix the first member and the second member to each other.

In one embodiment, the aforementioned weakening structure can be a U-shaped through-hole or a C-shaped through-hole, or can be a U-shaped through-hole with a dot-shaped through-hole, and the dot-shaped through-hole disposed at the opening of the U-shaped through-hole. In another embodiment, the weakening structure includes two linear through-holes respectively disposed at two sides of the first fastening hole. Further, two dot-shaped through-holes can be implemented between these linear through-holes, and respectively disposed at the other two sides of the first fastening hole. The above-mentioned electronic device can be an optical disc drive, including an optical disc read module arranged in the accommodating space formed by the first member and the second member.

In summary, in the optical disc drive and the housing adapted for use in an electronic device of the present invention, the structural strength of the housing is weakened by disposing through-holes around the fastening hole, so as to reduce the stress interference between the upper and the lower members and thereby to improve the smoothness of the appearance of the optical disc drive. Meanwhile, the requirement for the dimensional precision of the upper and the lower members can be less strict, so that the cost can be reduced.

In order to the make the aforementioned and other objects, features and advantages of the present invention comprehensible, some preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
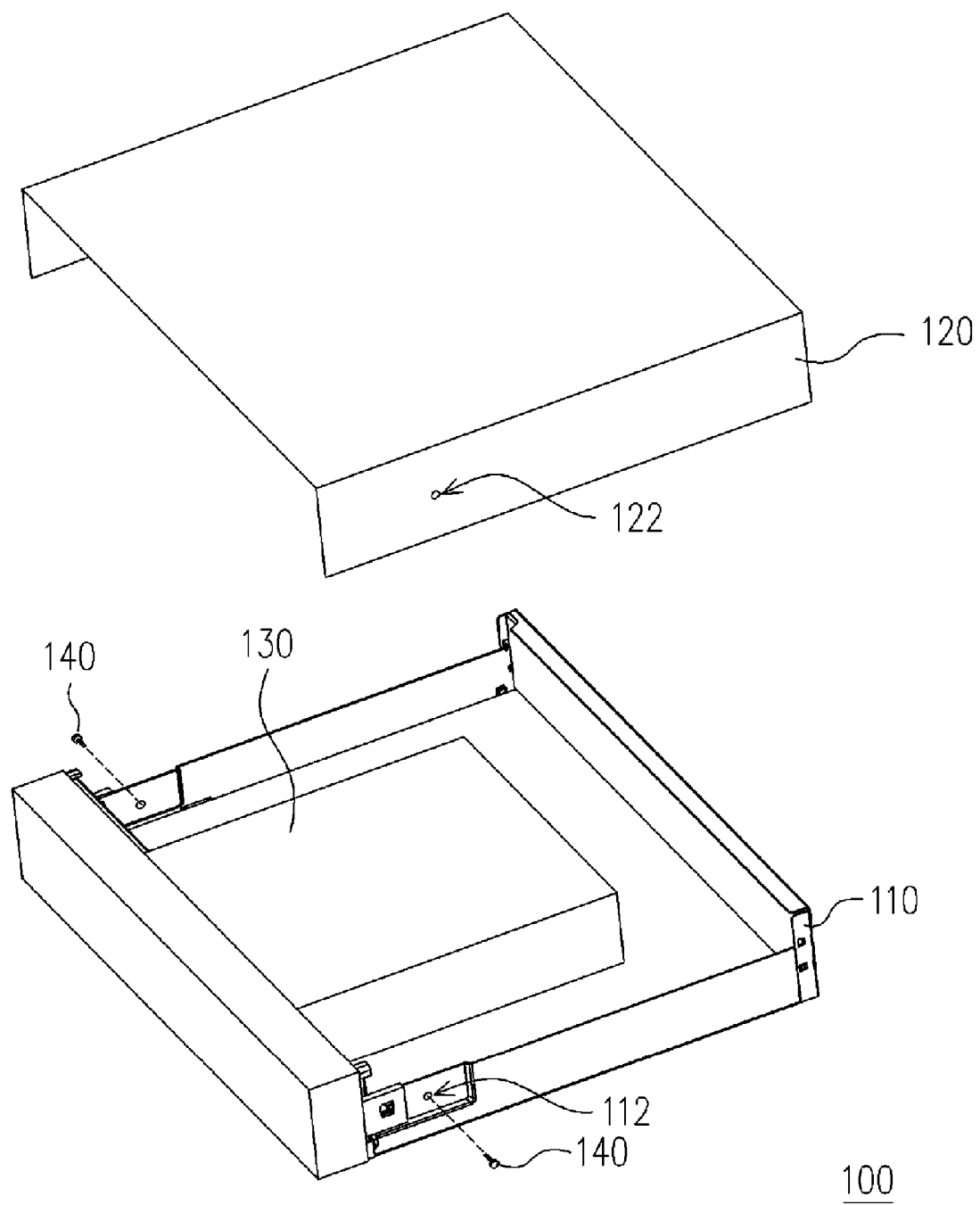
FIG. 1 depicts a schematic explosive view of a conventional optical disc drive.
Figure 2:
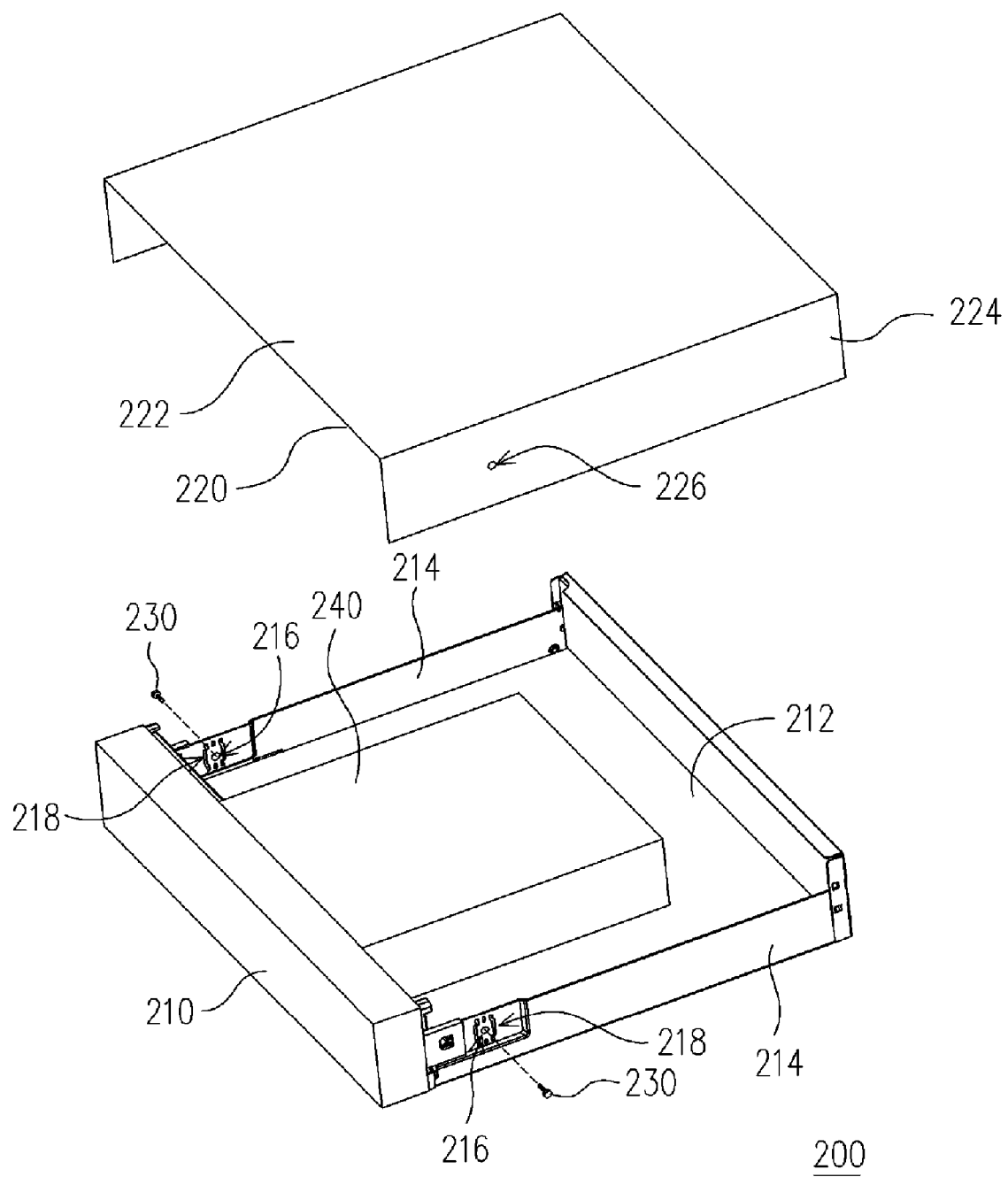
FIG. 2 depicts a schematic explosive view of an optical disc drive according to the present invention.
Figure 3:
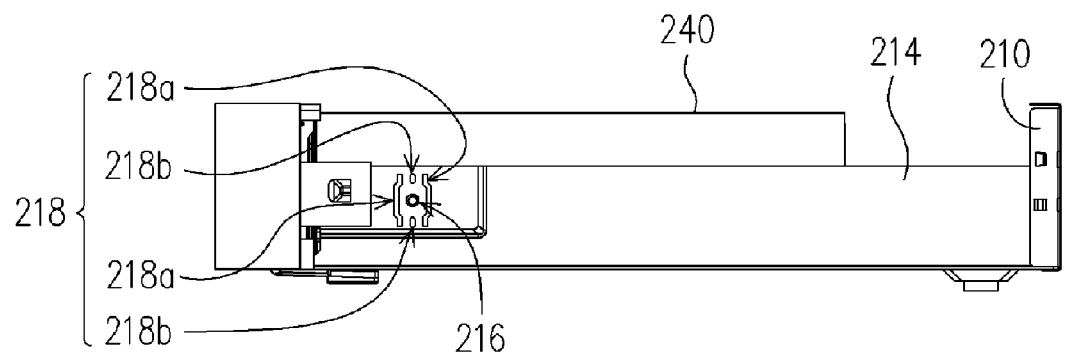
FIG. 3 depicts a side view of the second member and the optical disc read module of the optical disc drive in FIG. 2.

FIG. 2 depicts a schematic explosive view of an optical disc drive according to the present invention, and FIG. 3 depicts a side view of the second member and the optical disc read module of the optical disc drive in FIG. 2.

Referring to FIG. 2, the optical disc drive 200 includes a first member 210, a second member 220, at least one fastener 230 and an optical disc read module 240. The first member 210 is provided with a base plate 212 and multiple side plates 214 vertically connected to the perimeter of the base plate 212. The side plates 214 have at least one fastening hole 216 and at least one weakening structure 218 disposed around each fastening hole 216. The second member 220 is provided with a base plate 222 and multiple side plates 224 vertically connected to the perimeter of the base plate 222. The side plates 224 have at least one fastening hole 226. Each fastener 230 passes through a fastening hole 216 and a fastening hole 226 to fix the first member 210 and the second member 220 to each other, so as to form the housing of the optical disc drive 200. The fastener 230 can be a screw, a locking lug or any other fasteners that can be used to fix the first member 210 and the second member 220. The optical disc read module 240 is arranged in the accommodating space formed by the first member 210 and the second member 220, so as to be protected by the first member 210 and the second member 220. The optical disc read module 240 is used to read various optical discs like CD, VCD, DVD and so on. Of course, the optical disc read module 240 can also have the data write function, which facilitates the user to write data into the writable optical discs.

Because the fastening hole 216 is surrounded by the weakening structure 218, the structural strength of the side plate 214 near the fastening hole 216 can be weakened. As a result, even if the dimension of the first member 210 or the second member 220 deviates, only small portions of the stresses generated after the two members are locked to each other will transfer to each other via the side plate 214 near the fastening hole 216, and thereby the smoothness of the appearance of the optical disc drive 200 will be improved. Meanwhile, as the first member 210 and the second member 220 will be less likely to affect each other, the requirement for the respective dimensional precision of the first member 210 and the second member 220 can also be less strict, thereby resulting in reducing the cost of the first member 210 and the second member 220.

Now referring to FIG. 3, in a first embodiment according to the present invention, each weakening structure 218 includes two linear through-holes 218a and two dot-shaped through-holes 218b. The two linear through-holes 218a are disposed respectively at two sides of the fastening hole 216, and the linear through-holes 218a can be straight line or properly bended. The two dot-shaped through-holes 218b are disposed between the linear through-holes 218a, and also disposed respectively at the other two sides of the fastening hole 216. The dot-shaped through-holes 218b can be circular, elliptic or of other shapes. In this embodiment, the linear through-holes 218a are exemplarily disposed at the left and the right sides of the fastening hole 216; however, the linear through-holes 218a can also be disposed at the upper and the lower sides, or at the sides at other directions of the fastening hole 216.

Of course, the amount, shape, position, etc., related to the optical disc drive of the present invention are not limited by what is shown in FIG. 3. The weakening structure is mainly disposed around the fastening hole for weakening the structural strength of the side plate near the fastening hole. Several embodiments of the through-holes in the present invention will be illustrated with reference to the drawings hereinbelow.

Figure 4:
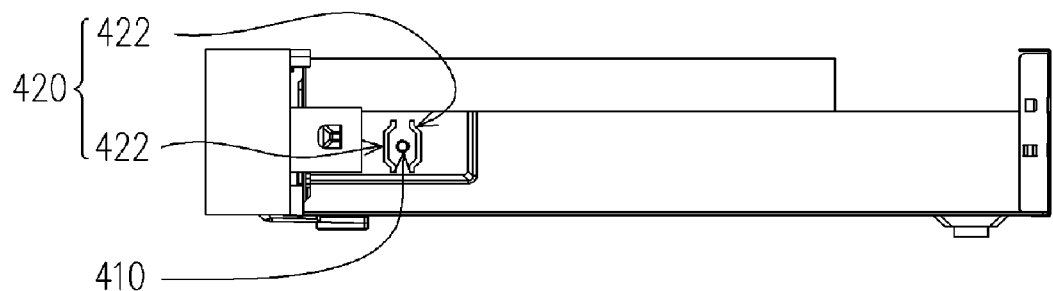
FIGS. 4 to 8 depict several embodiments of the weakening structure according to the present invention.
Figure 5:
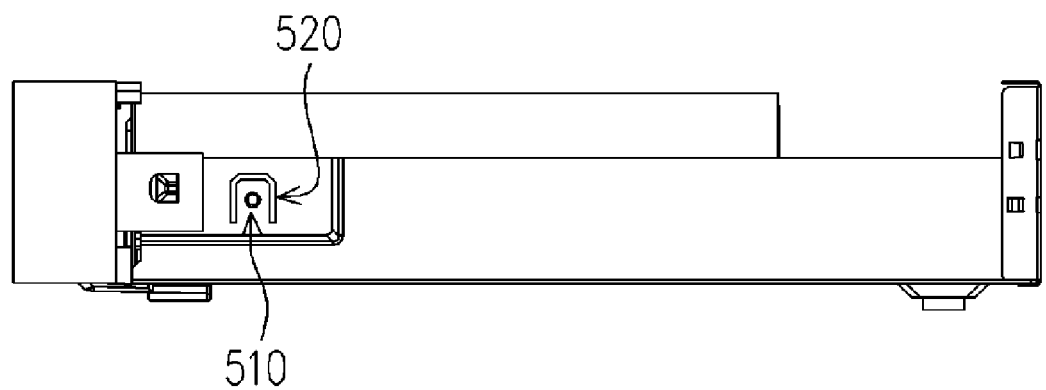
Figure 6:
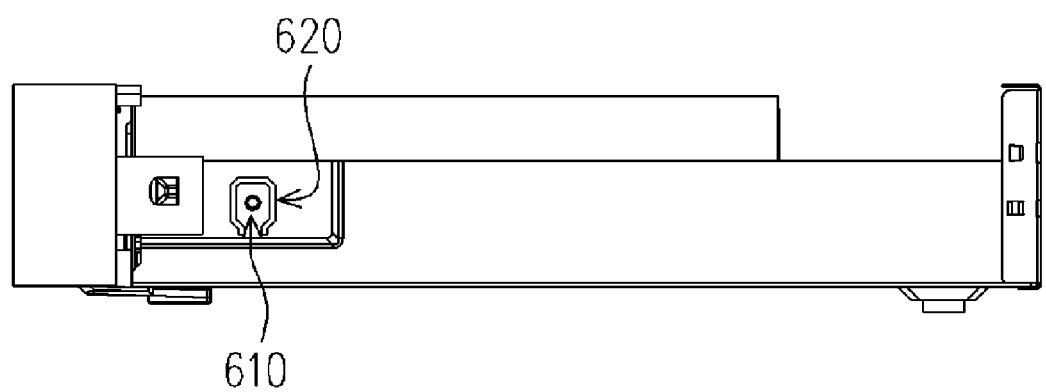
Figure 7:
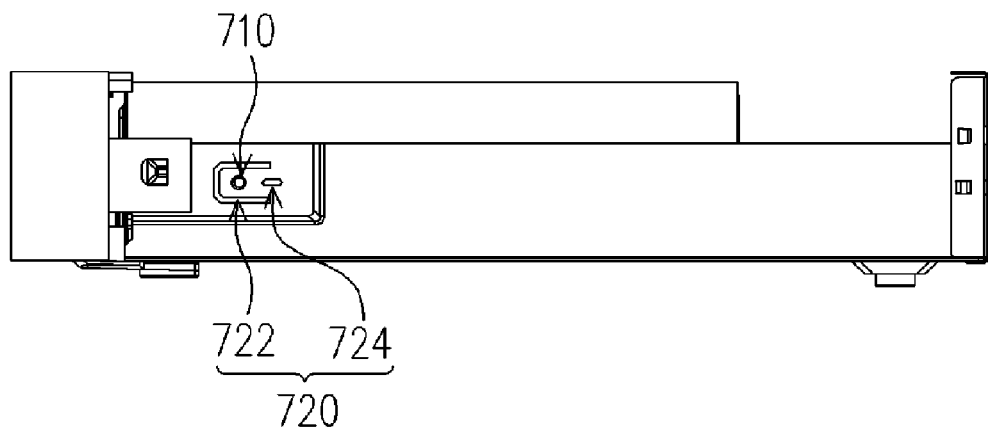
Figure 8:
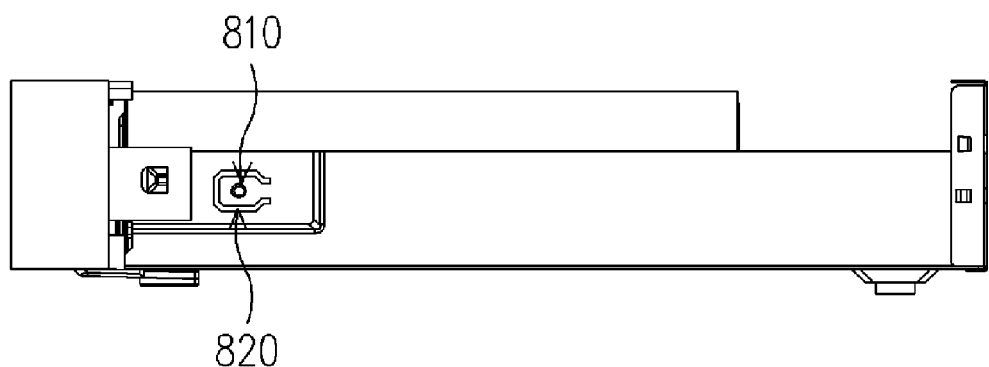

Referring to FIG. 4, in a second embodiment according to the present invention, each weakening structure 420 includes two linear through-holes 422 disposed respectively at two sides of a fastening hole 410. Referring to FIG. 5, in a third embodiment according to the present invention, each weakening structure 520 is a U-shaped through-hole, and is disposed around the fastening hole 510. Referring to FIG. 6, in a fourth embodiment according to the present invention, each weakening structure 620 is a C-shaped through hole, and is disposed around the fastening hole 610. Referring to FIG. 5 and FIG. 7, in a fifth embodiment according to the present invention, a weakening structure 720 includes a U-shaped through-hole 722 similar to the weakening structure 520 in FIG. 5 and a dot-shaped through-hole 724 disposed at the opening side of the U-shaped through-hole 722. Referring to FIG. 6 and FIG. 8, in a sixth embodiment according to the present invention, the weakening structure 820 is a C-shaped through-hole similar to the weakening structure 620 in FIG. 6, in which the opening side of the weakening structure 620 faces downward, however, the opening side of the weakening structure 820 faces the rear end of the optical disc drive 200. Various weakening structures in FIGS. 3 to 8 are only used for exemplary illustration, and are not intended to limit the present invention.

In summary, in an optical disc drive of the present invention, because there is a weakening structure disposed around the fastening hole of the housing, the structural strength of the housing can be weakened, which further reduces the possibility that the stress transfers outward from the circumference of the fastening hole. The housing of the present invention can also be widely used in various electronic devices in addition to the optical disc drive. Thus, it can avoid the stress interference between the combined members of the housing caused by the dimensional deviation, thereby improving the appearance smoothness of the electronic device and the product yield. Meanwhile, the requirement for the dimensional precision of the upper and the lower members can be less strict, so that the cost can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive, comprising:
  a first member, having a first base plate and a first side plate vertically connected to the first base plate, wherein the first side plate has a first fastening hole and a weakening structure disposed around the first fastening hole;
  a second member, having a second base plate and a second side plate vertically connected to the second base plate, wherein the second side plate has a second fastening hole;

a fastener, passing through the first fastening hole and the second fastening hole to fix the first member and the second member to each other; and an optical disc read module, disposed in the accommodating space formed by the first member and the second member.

2. The optical disc drive according to claim 1, wherein the weakening structure includes a U-shaped through-hole or a C-shaped through-hole.

3. The optical disc drive according to claim 1, wherein the weakening structure includes a U-shaped through-hole and a dot-shaped through-hole, and the dot-shaped through-hole is disposed at an opening side of the U-shaped through-hole.

4. The optical disc drive according to claim 1, wherein the weakening structure includes two linear through-holes disposed respectively at two sides of the first fastening hole.

5. The optical disc drive according to claim 4, wherein the weakening structure further includes two dot-shaped through-holes disposed between the linear through-holes and disposed respectively at two sides of the first fastening hole.

6. A housing, suitable for use in an electronic device, comprising:

a first member, having a first fastening hole and a weakening structure disposed around the first fastening hole;

a second member, having a second fastening hole; and a fastener, passing through the first fastening hole and the second fastening hole to fix the first member and the second member to each other.

7. The housing according to claim 6, wherein the weakening structure includes a U-shaped through-hole or a C-shaped through-hole.

8. The housing according to claim 6, wherein the weakening structure includes a U-shaped through-hole and a dot-shaped through-hole, and the dot-shaped through-hole is disposed at an opening side of the U-shaped through-hole.

9. The housing according to claim 6, wherein the weakening structure includes two linear through-holes disposed at two sides of the first fastening hole.

10. The housing according to claim 9, wherein the weakening structure further includes two dot-shaped through-holes disposed between the linear through-holes and disposed respectively at two sides of the first fastening hole.

11. The housing according to claim 6, wherein the electronic device is an optical disc drive, and the optical disc drive further comprises:

an optical disc read module, arranged in the accommodating space formed by the first member and the second member.

* * * * *